(12) United States Patent
Kim et al.

(10) Patent No.: US 9,711,132 B1
(45) Date of Patent: Jul. 18, 2017

(54) FOCUSING ULTRASONIC TRANSDUCER TO WHICH ACOUSTIC LENS USING FRESNEL ZONE PLATE IS APPLIED AND METHOD FOR MANUFACTURING FOCUSING ULTRASONIC TRANSDUCER

(71) Applicant: Korea Research Institute of Standards and Science, Daejeon (KR)

(72) Inventors: Yong Tae Kim, Daejeon (KR); Kyung Min Baik, Daejeon (KR); Il Doh, Daejeon (KR); Se Hwa Kim, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 0 days.

(21) Appl. No.: 15/247,334

(22) Filed: Aug. 25, 2016

(30) Foreign Application Priority Data

Apr. 27, 2016 (KR) .......................... 10-2016-0051605

(51) Int. Cl.
*G10K 11/30* (2006.01)
*G01S 7/521* (2006.01)
*G01S 15/02* (2006.01)

(52) U.S. Cl.
CPC .............. *G10K 11/30* (2013.01); *G01S 7/521* (2013.01); *G01S 15/02* (2013.01)

(58) Field of Classification Search
CPC ......... G10K 11/30; G01S 7/521; G01G 15/02
USPC ......................................................... 181/176
See application file for complete search history.

(56) References Cited

U.S. PATENT DOCUMENTS

| 5,577,507 A * | 11/1996 | Snyder ................. A61B 8/4281 600/472 |
| 6,787,974 B2 * | 9/2004 | Fjield ..................... G10K 11/30 310/335 |
| 8,616,329 B1 * | 12/2013 | Welter ................... G10K 11/30 181/167 |
| 2012/0029393 A1 * | 2/2012 | Lee ....................... A61B 8/4444 601/2 |

FOREIGN PATENT DOCUMENTS

| KR | 1020030082303 | 10/2003 |
| KR | 1020120004896 | 1/2012 |
| KR | 1020150091373 | 8/2015 |
| KR | 1020150096401 | 8/2015 |

\* cited by examiner

*Primary Examiner* — Forrest M Phillips
(74) *Attorney, Agent, or Firm* — Hoffman & Baron, LLP

(57) ABSTRACT

The present disclosure relates to an acoustic lens using a Fresnel zone plate, a design method and a manufacturing method of the acoustic lens, a focusing ultrasonic transducer to which the acoustic lens is applied, and a manufacturing method of the focusing ultrasonic transducer. More specifically, an acoustic lens using a Fresnel zone plate which is applied to a focusing ultrasonic transducer. The acoustic lens includes a plurality of concentric regions which is concentrically disposed with respect to a center point. In the concentric region, a sound insulation region which blocks an entering sound wave and a transmission region which transmits the sound wave are alternately formed in a radial direction from the center point, and the entering sound wave is focused near a focal point.

16 Claims, 15 Drawing Sheets
(8 of 15 Drawing Sheet(s) Filed in Color)

| index | ring radiis(mm) | | | | | | | | | |
|---|---|---|---|---|---|---|---|---|---|---|
| | 1 MHz | 2 MHz | 3 MHz | 4 MHz | 5 MHz | 6 MHz | 7 MHz | 8 MHz | 9 MHz | 10 MHz |
| b1 | 6.8 | 4.8 | 3.9 | 3.4 | 3.0 | 2.8 | 2.6 | 2.4 | 2.3 | 2.2 |
| b2 | 9.7 | 6.8 | 5.6 | 4.8 | 4.3 | 3.9 | 3.6 | 3.4 | 3.2 | 3.0 |
| b3 | 12.0 | 8.4 | 6.8 | 5.9 | 5.3 | 4.8 | 4.5 | 4.2 | 3.9 | 3.7 |
| b4 | 13.9 | 9.7 | 7.9 | 6.8 | 6.1 | 5.6 | 5.2 | 4.8 | 4.5 | 4.3 |
| b5 | 15.7 | 10.9 | 8.9 | 7.7 | 6.8 | 6.2 | 5.8 | 5.4 | 5.1 | 4.8 |
| b6 | 17.3 | 12.0 | 9.7 | 8.4 | 7.5 | 6.8 | 6.3 | 5.9 | 5.6 | 5.3 |
| b7 | 18.8 | 13.0 | 10.5 | 9.1 | 8.1 | 7.4 | 6.8 | 6.4 | 6.0 | 5.7 |
| b8 | 20.2 | 13.9 | 11.3 | 9.7 | 8.7 | 7.9 | 7.3 | 6.8 | 6.4 | 6.1 |
| b9 | 21.5 | 14.8 | 12.0 | 10.3 | 9.2 | 8.4 | 7.8 | 7.3 | 6.8 | 6.5 |
| b10 | 22.8 | 15.7 | 12.7 | 10.9 | 9.7 | 8.9 | 8.2 | 7.7 | 7.2 | 6.8 |
| b11 | 24.1 | 16.5 | 13.3 | 11.5 | 10.2 | 9.3 | 8.6 | 8.0 | 7.6 | 7.2 |
| b12 | 25.3 | 17.3 | 13.9 | 12.0 | 10.7 | 9.7 | 9.0 | 8.4 | 7.9 | 7.5 |
| b13 | 26.5 | 18.0 | 14.5 | 12.5 | 11.1 | 10.1 | 9.4 | 8.8 | 8.2 | 7.8 |
| b14 | 27.6 | 18.8 | 15.1 | 13.0 | 11.6 | 10.5 | 9.7 | 9.1 | 8.6 | 8.1 |
| b15 | 28.7 | 19.5 | 15.7 | 13.5 | 12.0 | 10.9 | 10.1 | 9.4 | 8.9 | 8.4 |

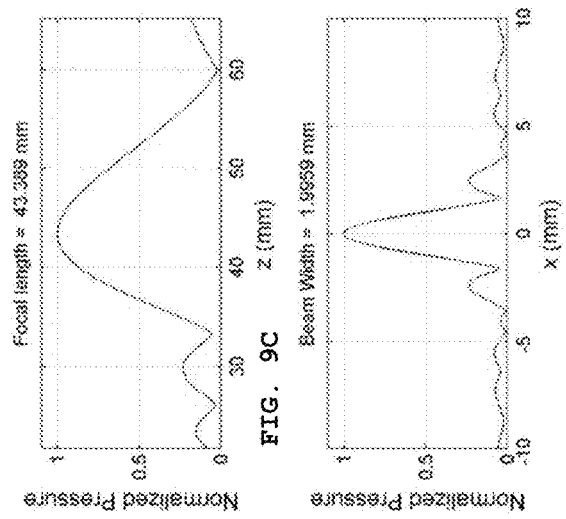
FIG. 9C
FIG. 9D
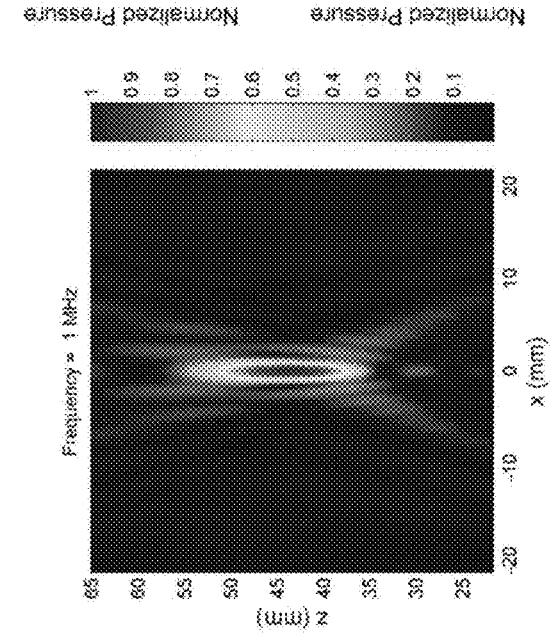
FIG. 9B
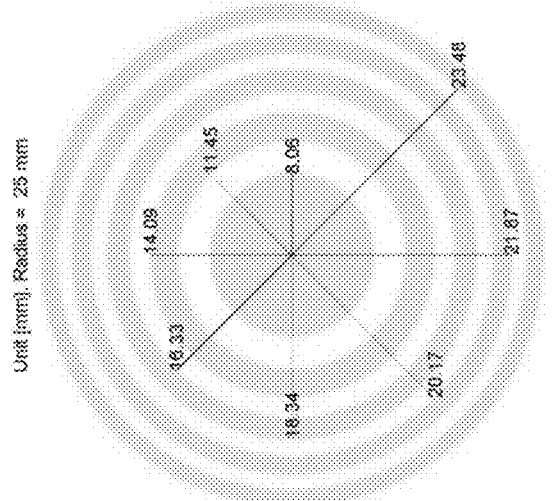
FIG. 9A

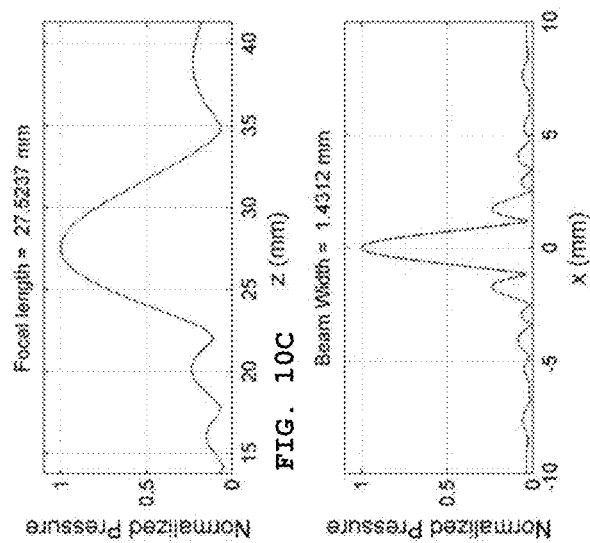
FIG. 10C
FIG. 10D
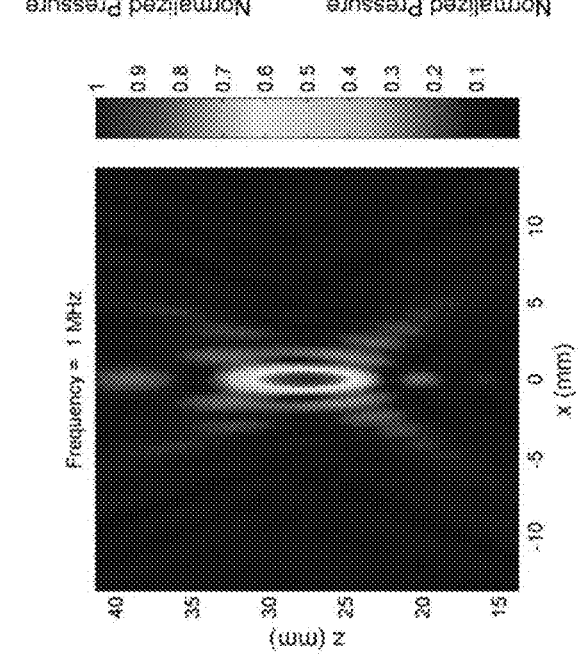
FIG. 10B
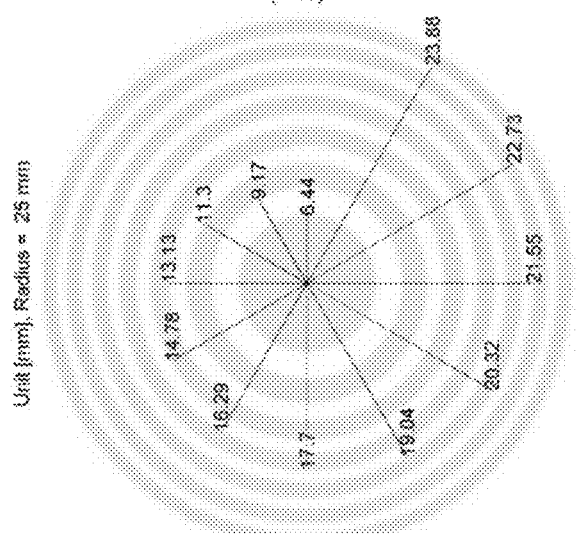
FIG. 10A

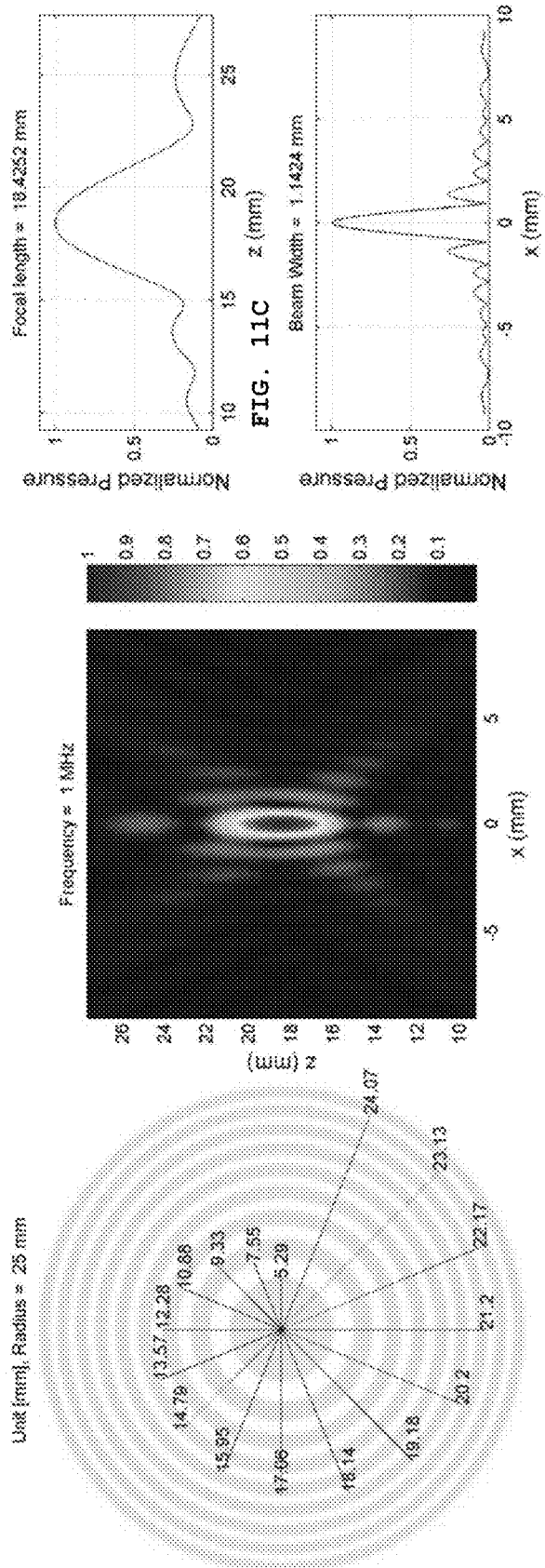

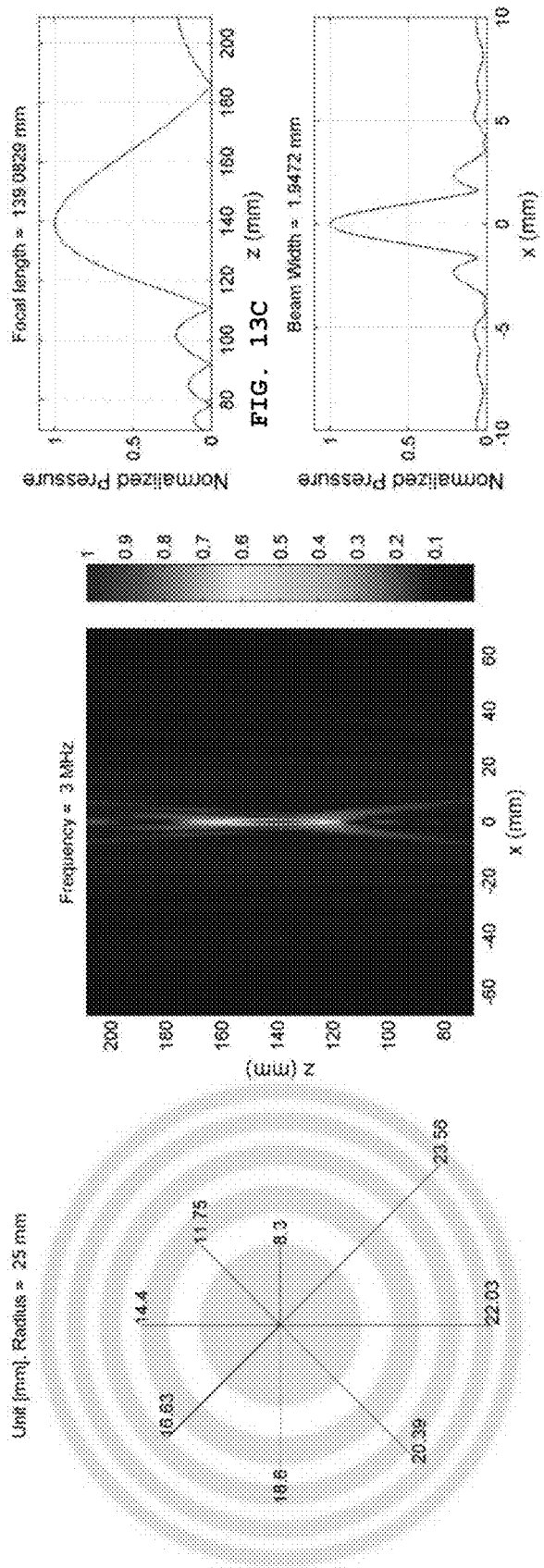

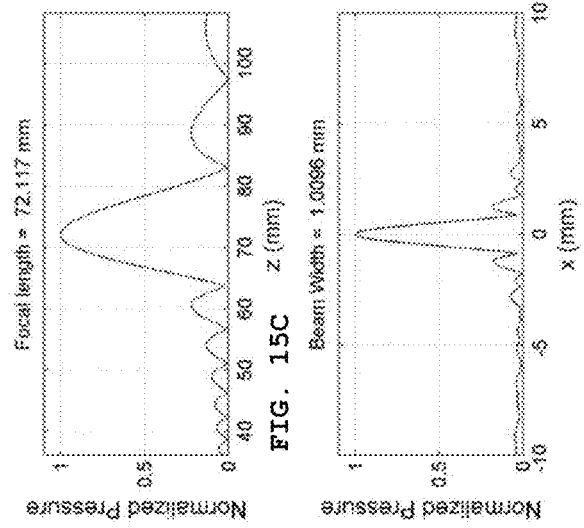
FIG. 15C
FIG. 15D
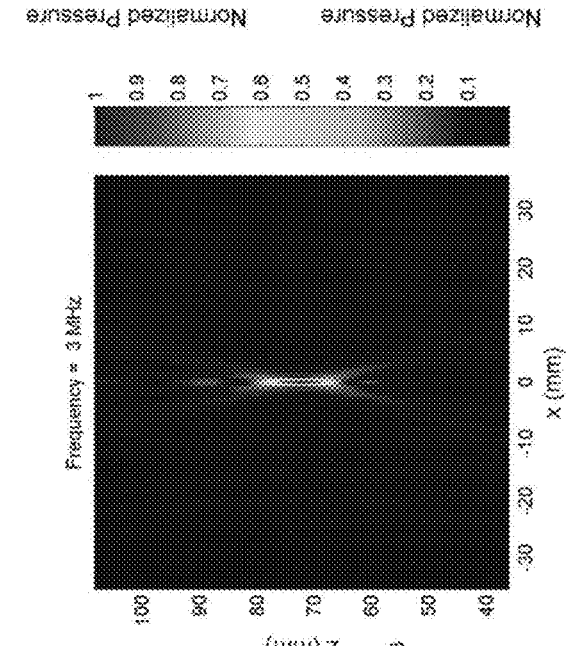
FIG. 15B
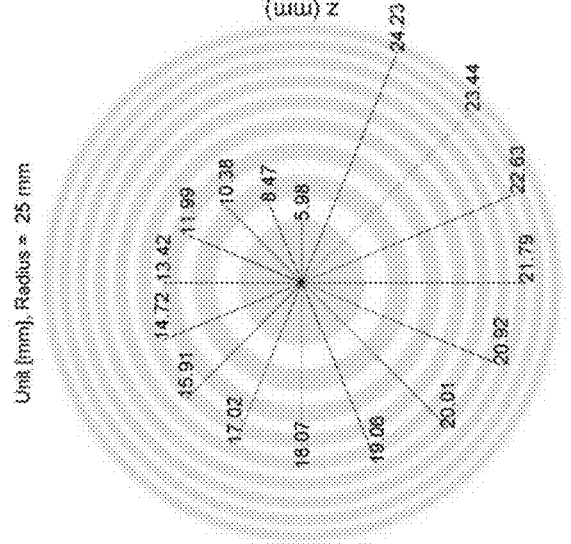
FIG. 15A

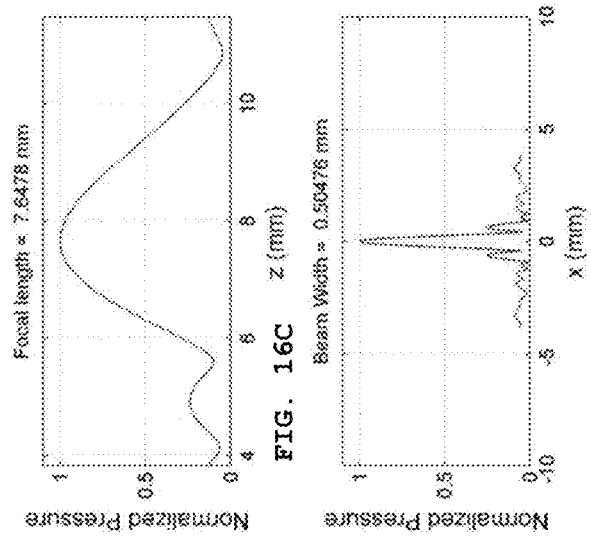
FIG. 16C
FIG. 16D
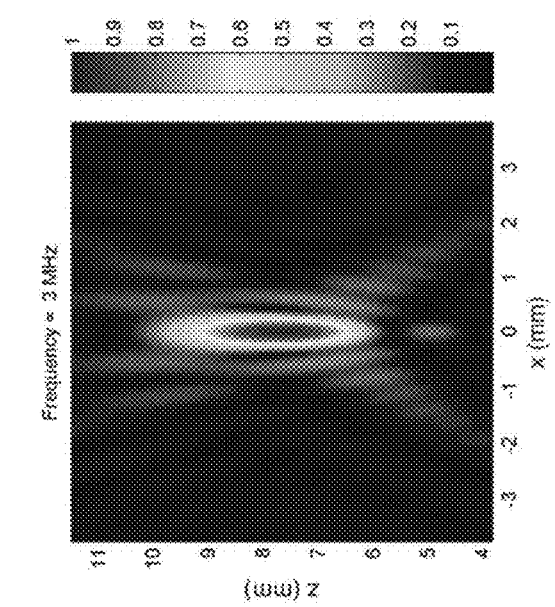
FIG. 16B
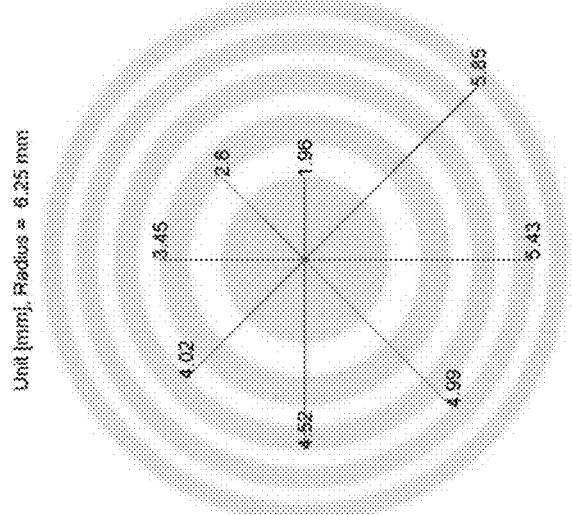
FIG. 16A

FOCUSING ULTRASONIC TRANSDUCER TO WHICH ACOUSTIC LENS USING FRESNEL ZONE PLATE IS APPLIED AND METHOD FOR MANUFACTURING FOCUSING ULTRASONIC TRANSDUCER

CROSS-REFERENCE TO RELATED APPLICATIONS

This application claims the priority of Korean Patent Application No. 10-2016-0051605, filed on Apr. 27, 2016, the disclosure of which is incorporated herein by reference in its entirety.

BACKGROUND

Field

The present disclosure relates to an acoustic lens using a Fresnel zone plate, a design method and a manufacturing method of the acoustic lens, a focusing ultrasonic transducer to which the acoustic lens is applied, and a manufacturing method of the focusing ultrasonic transducer.

Description of the Related Art

An ultrasonic transducer is a device which converts an electric signal into an ultrasonic signal or converts an ultrasonic signal into an electric signal.

The ultrasonic wave is a sound wave having a frequency higher than an audible frequency range of human hearing, that is, higher than 20 kHz. Humans cannot hear the ultrasonic wave using a sense of hearing. The ultrasonic wave is widely utilized in various fields and provides convenience in lots of areas of our life.

For example, the ultrasonic wave is used for a medical imaging diagnostic instrument. When the ultrasonic wave is used, a photograph or an image of a bodily tissue or an organ may be obtained by a non-invasive method.

Further, the ultrasonic transducer may be used to detect an external object. That is, when an ultrasonic signal is output using the ultrasonic transducer and then the output ultrasonic signal returns by being reflected from the external object, the reflected ultrasonic signal is received to measure a time taken while the ultrasonic signal returns. Presence of the external object and a distance to the external object may be calculated using the measured time.

There are three types of ultrasonic transducers that are used currently, for example, an ultrasonic transducer using a magnetic field, an ultrasonic transducer using an electric field, and an ultrasonic transducer using a piezoelectric material.

Among the three types of ultrasonic transducers, the ultrasonic transducer using a piezoelectric material is widely used because it is advantageous to reduce size and has good durability in a high frequency band (an ultrasonic band).

A piezoelectric effect is a phenomenon in which when a mechanical vibration is applied, a potential difference is generated in a crystal. Conversely, the piezoelectric effect also includes a phenomenon in which when an electric field is applied to the crystal, a mechanical vibration is generated.

Therefore, an ultrasonic transducer using a piezoelectric element generates an ultrasonic wave by a vibration generated in the piezoelectric element by applying an electric field to the piezoelectric element.

Among materials which form the piezoelectric element, Rochelle salt and quartz are single crystals, and barium titanate ($BaTiO_3$), lead titanate ($PbTiO_3$), and lead zirconate ($PbZrO_3$) are multi-crystals.

When the above-mentioned piezoelectric characteristic is used, a converter for generating an ultrasonic wave, a converter for reception, or a converter for transmitting and receiving a signal may be manufactured.

In the meantime, when the ultrasonic transducer is used to detect an external object or for a visual auxiliary device for a visually impaired person, a directivity of an ultrasonic signal which is generally output is not an important factor. However, a high directivity is required to receive the ultrasonic signal.

Further, a focusing ultrasonic transducer is configured to include an acoustic lens to focus an ultrasonic wave which is excited by an ultrasonic shaker near a focal point.

FIG. 1 illustrates a cross-sectional view of an ultrasonic transducer 1 to which a spherical acoustic lens 2 of the related art is applied. As illustrated in FIG. 1, an ultrasonic shaker 10 excites an ultrasonic wave so that the ultrasonic wave enters the acoustic lens 2. The entering ultrasonic wave is focused near a focal point by the acoustic lens 2.

It is understood that an ultrasonic wave emitting surface of the acoustic lens 2 of the related art is configured by a concave surface having a predetermined radius curvature which is recessed toward an entering surface. However, in the case of the spherical acoustic lens 2 of the related art, an impedance of a material for the acoustic lens needs to be lower than an impedance of a material of the ultrasonic shaker 10 and higher than an impedance of a transmitting material. Therefore, a selectable material is limited thereto.

Further, a large thickness of the spherical acoustic lens 2 of the related art is inevitable due to the curvature radius, so that it is difficult to reduce weight and size.

SUMMARY

An object to be achieved by the present disclosure is to provide an acoustic lens using a Fresnel zone plate which is formed with a disk shape so that a thickness is small to reduce weight and size, and which is free from a size limitation and easily achieves focusing implementation as compared with the related art.

Further, another object to be achieved by an exemplary embodiment of the present disclosure is to provide a designing method and a manufacturing method of an acoustic lens which are capable of quickly and efficiently designing radii of a plurality of concentric regions in an acoustic lens that is easily focused in a focal length, where a transmission region and a sound insulation region intersect.

Other technical objects to be achieved in the present disclosure are not limited to the aforementioned technical objects, and other not-mentioned technical objects will be obviously understood by those skilled in the art from the description below.

A first object of the present disclosure is to provide acoustic lens using a Fresnel zone plate which is applied to a focusing ultrasonic transducer. The acoustic lens using a Fresnel zone plate includes a plurality of concentric regions concentrically disposed with respect to a center point. Herein, in the concentric region, a sound insulation region which blocks an entering sound wave and a transmission region which transmits the sound wave are alternately formed in a radial direction from the center point, and the entering sound wave is focused near a focal point.

The acoustic lens may be configured to be planar such that both surfaces are flat surfaces and a thickness is constant.

A radius of each of the plurality of sound insulation regions and transmission regions in the concentric regions may be calculated based on a set focal length of the acoustic lens and a wavelength in a transmission medium determined from a frequency of the set sound wave.

The radii of the plurality of sound insulation regions and the plurality of transmission regions in the concentric region may be calculated by $$b_m = m\lambda\left(F + \frac{m\lambda}{4}\right), \quad (1)$$

where m is an index of the sequential concentric regions from the center point to the radial direction, $\lambda$ is a wavelength of a sound wave in the transmission medium, and F is a focal length of the acoustic lens.

The focal length of the acoustic lens is defined by $$F = \frac{R_a^2}{m\lambda} - \frac{m\lambda}{4}, \quad (2)$$

where $R_a$ is a radius of the acoustic lens, $\lambda$ is a wavelength of the sound wave in the transmission medium, and m is the number of concentric regions in the acoustic lens.

The transmissive material which configures the transmission region may be at least one of glass and rubber, and the sound insulation material which configures the sound insulation region may be air or an acoustic absorbent having a composite material which induces a scattering process of the sound wave and a matrix material which fills a base of the acoustic absorbent during the scattering process of the sound wave.

The thickness of the acoustic lens may be larger than an ultrasonic wavelength in the sound insulation region and smaller than the ultrasonic wavelength in the transmission region.

A second object of the present disclosure is to provide an ultrasonic transducer to which an acoustic lens using a Fresnel zone plate is applied. The ultrasonic transducer includes an ultrasonic shaker which excites an ultrasonic wave; and an acoustic lens according to the first object which receives an ultrasonic wave from the ultrasonic shaker and focuses the entering ultrasonic wave near a focal point.

The ultrasonic shaker may be configured by a piezoelectric element.

A third object of the present disclosure is to provide a method for designing an acoustic lens according to the first object. The method includes determining a desired ultrasonic frequency and a desired focal length; calculating an ultrasonic wavelength in a transmitting medium; calculating radii of a plurality of sound insulation regions and a plurality of transmission regions in a concentric region, based on the ultrasonic wavelength and the focal length; determining the radius of the manufactured acoustic lens within the radius of the ultrasonic shaker and the number of concentric regions; and manufacturing the acoustic lens to comply with the number of concentric regions, the radius of the acoustic lens, and radii of the plurality of sound insulation regions and a plurality of transmission regions in the concentric region.

In the calculating of radii, radii of the plurality of sound insulation regions and the plurality of transmission regions in the concentric region may be calculated by equation (1) given as $$b_m = m\lambda\left(F + \frac{m\lambda}{4}\right),$$

where m is an index of the sequential concentric regions from the center point to the radial direction, $\lambda$ is a wavelength of a sound wave in the transmission medium, and F is a focal length of the acoustic lens.

In the calculating of radii, radii of sequential concentric regions at an ultrasonic frequency for every focal length may be calculated to be stored as a database.

A fourth object of the present disclosure is to provide a method for manufacturing an acoustic lens using Fresnel zone plate. The method includes manufacturing a mold in which a disc shaped protrusion is provided at a center and concentric concave portions and convex portions are alternately and sequentially formed in a radial direction from the protrusion; filling a transmissive material which transmits a sound wave in the mold; sealing the filled transmissive material by coupling the cap to an upper portion of the mold; hardening the transmissive material; and removing the cap and detaching the hardened transmissive material to manufacture the acoustic lens.

An outermost edge of the mold is configured by a boundary edge which may be higher than the convex portion, the cap may be coupled to the boundary edge and the transmissive material may be filled in a space between the cap and the mold.

The method may further include filling the sound insulation material which blocks the sound wave in the concave edge of the detached acoustic lens and hardening the sound insulation material. Herein, the hardened transmissive material configures the transmission region of the acoustic lens and the hardened sound insulation material configures a sound insulation region of the acoustic lens.

A fifth object of the present disclosure is to provide a method for manufacturing an ultrasonic transducer to which an acoustic lens using a Fresnel zone plate is applied. The method includes manufacturing an acoustic lens by the manufacturing method according to the fourth object; and coupling the acoustic lens to an ultrasonic shaker which excites the ultrasonic wave.

According to an exemplary embodiment of the present disclosure, an acoustic lens using a Fresnel zone plate is formed with a disk shape so that a thickness is small to reduce weight and size, and it is free from a size limitation and focusing implementation may be easily achieved as compared with the related art.

Further, according to an exemplary embodiment of the present disclosure, it is possible to quickly and efficiently design radii of a plurality of concentric circle areas of an acoustic lens which is easily focused in a focal distance, where a transmission region and a sound insulation region intersect.

The effects to be achieved by the present disclosure are not limited to aforementioned effects and other effects, which are not mentioned above, will be apparent to those skilled in the art from the following description.

BRIEF DESCRIPTION OF THE DRAWINGS

The patent or application contains at least one drawing executed in color. Copies of this patent or patent application publication with color drawing(s) will be provided by the U.S. Patent and Trademark Office upon request and payment of the necessary fee.

The accompanying drawings in the specification illustrate an exemplary embodiment of the present disclosure. The technical essence of the present disclosure will be more clearly understood from the following detailed description taken in conjunction with the accompanying drawings.

Figure 1:
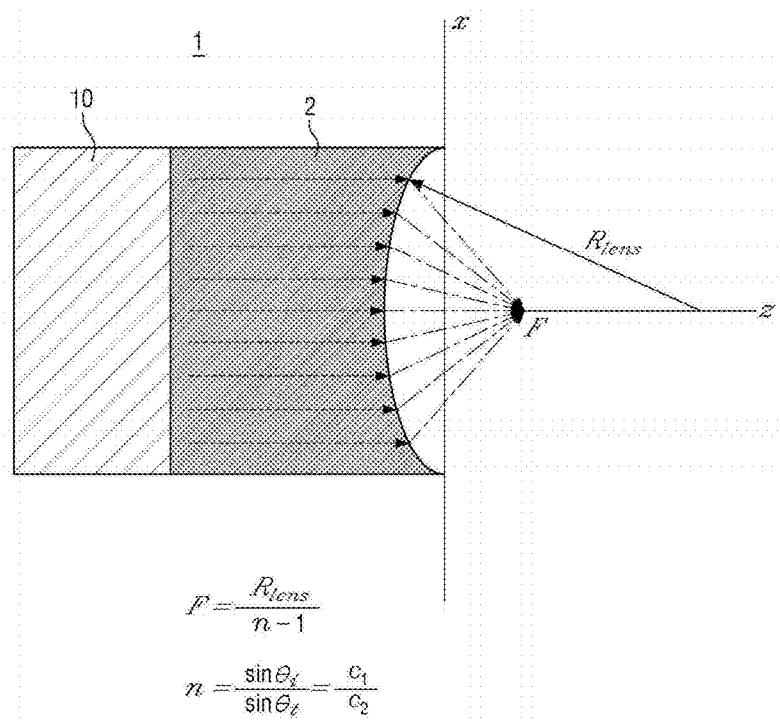
Figure 2:
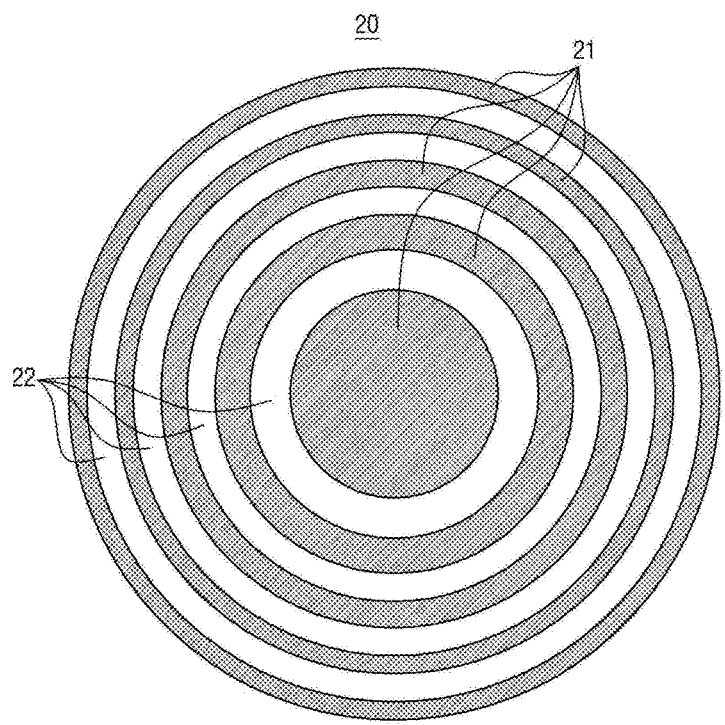
Figure 3:
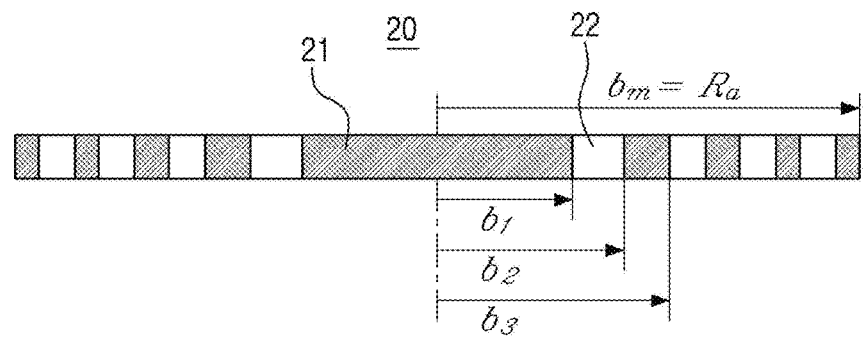
Figure 4:
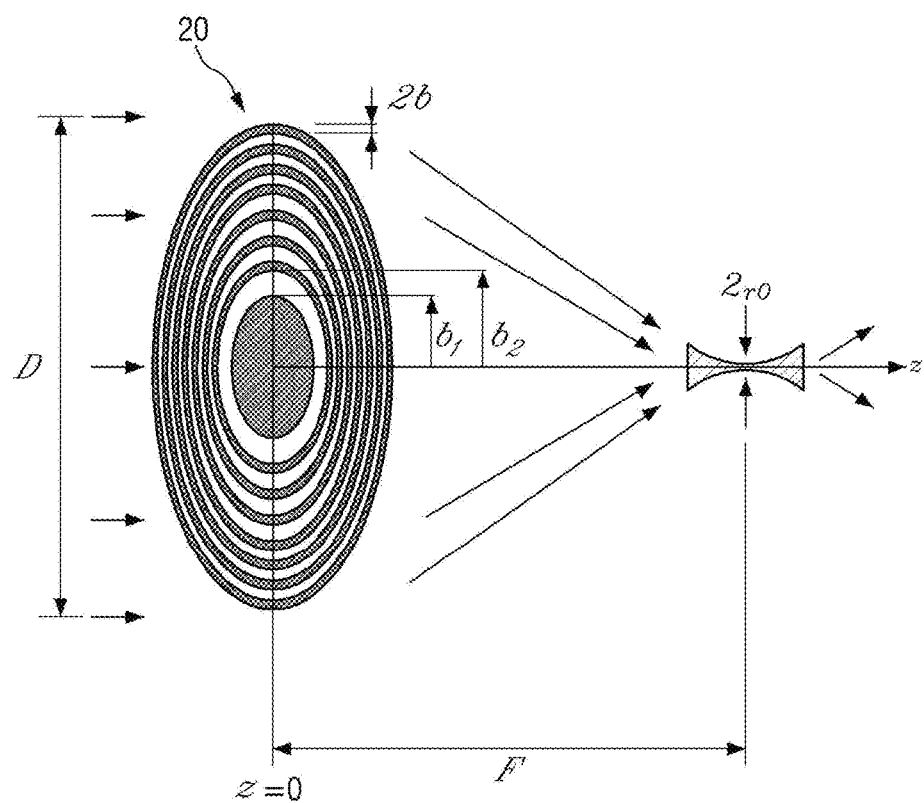
Figure 5:
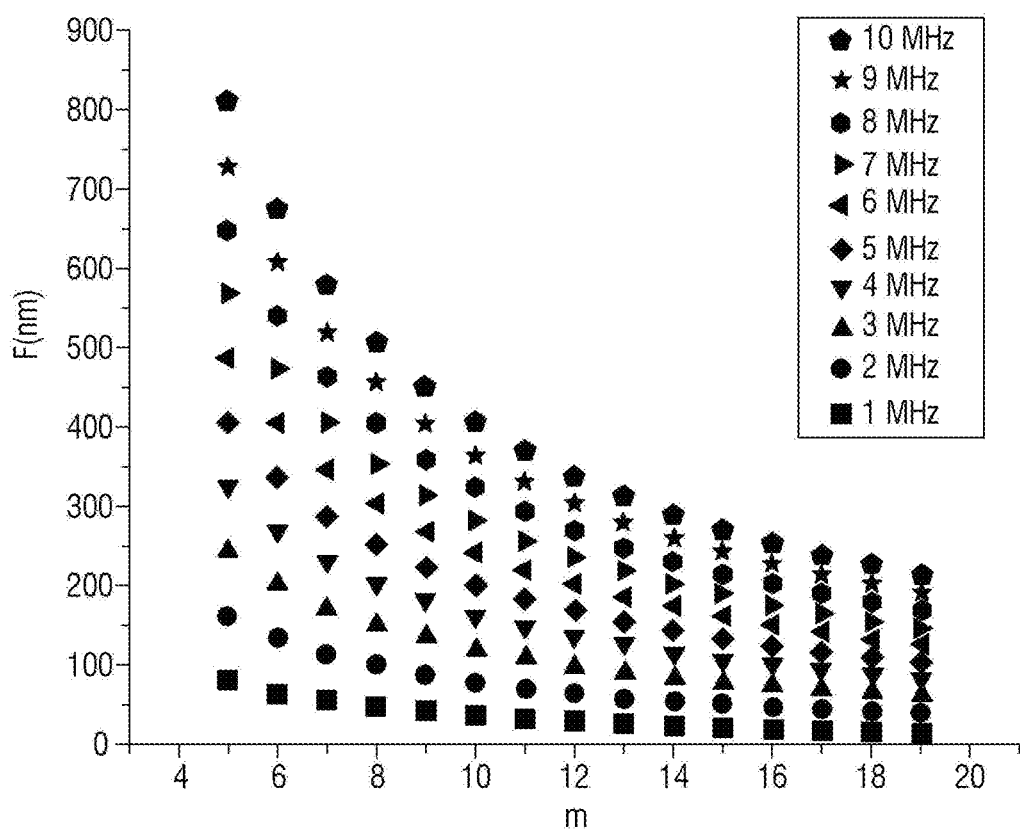
Figure 6:
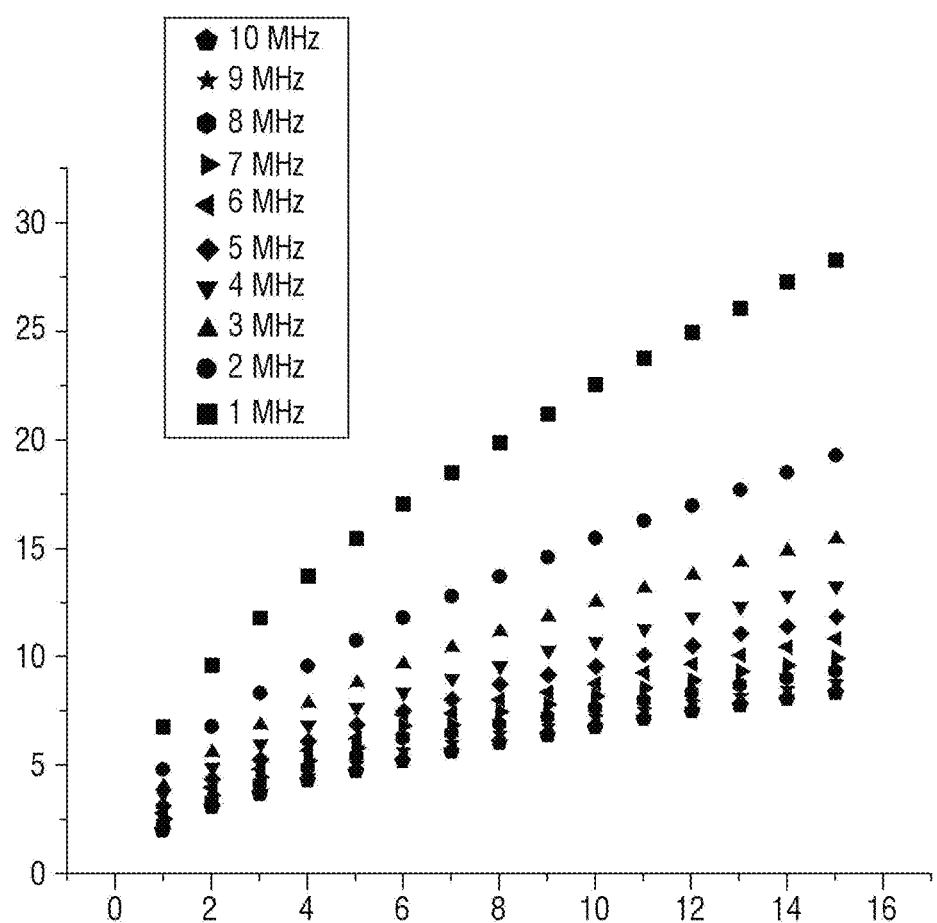
Figures 7, 8:
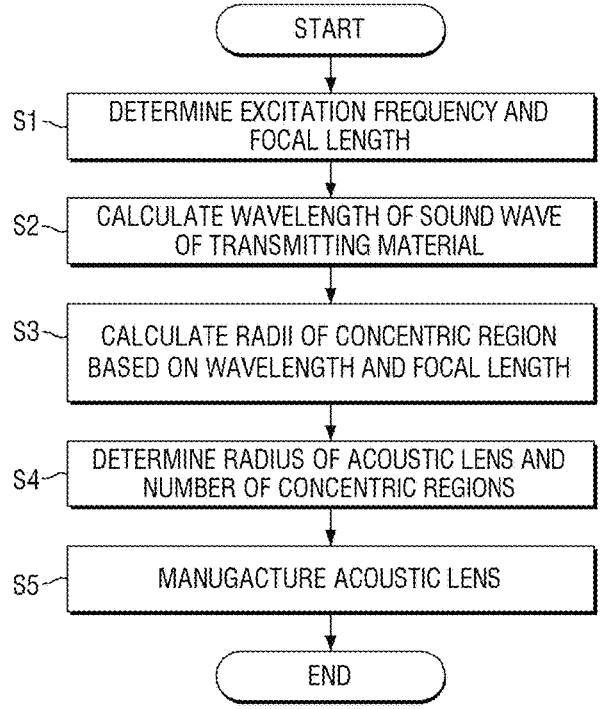
Figures 12A, 12B, 12C, 12D:
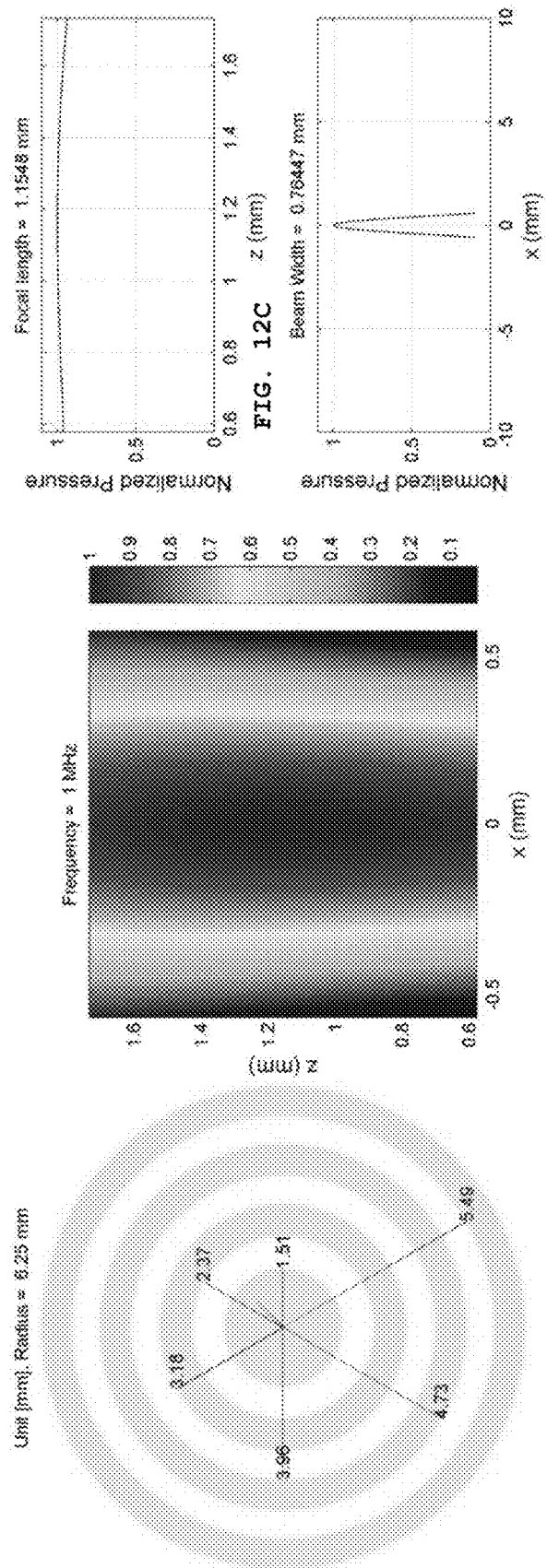
Figures 14A, 14B, 14C, 14D:
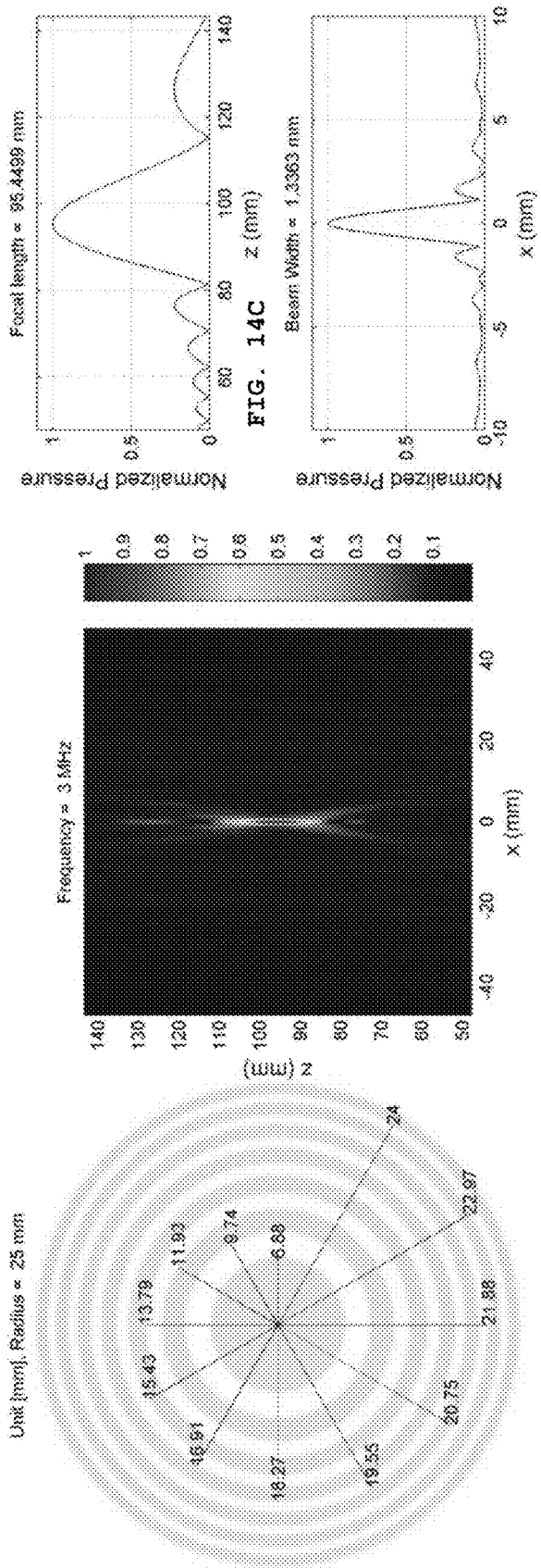
Figure 17:
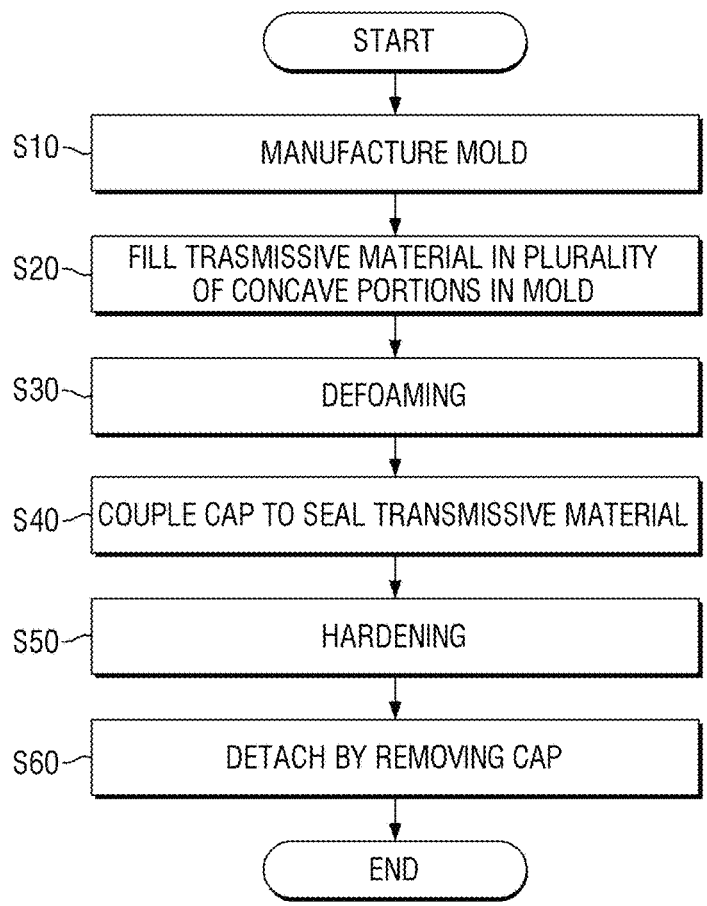
Figure 18:
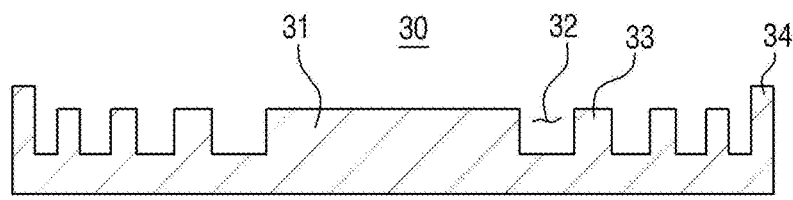
Figure 19:
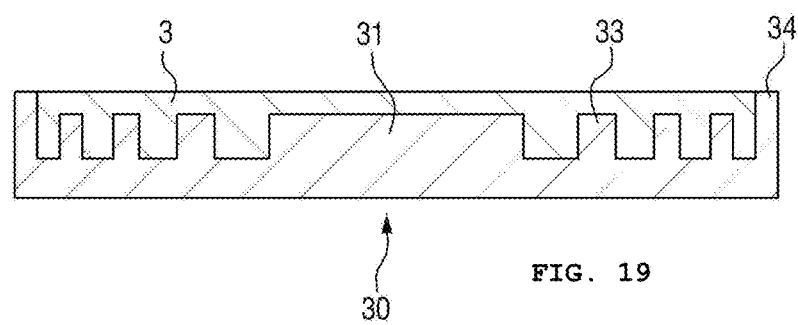
Figure 20:
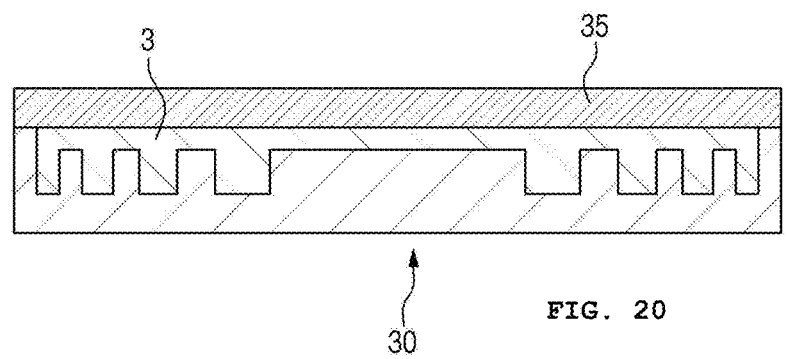
Figure 21:
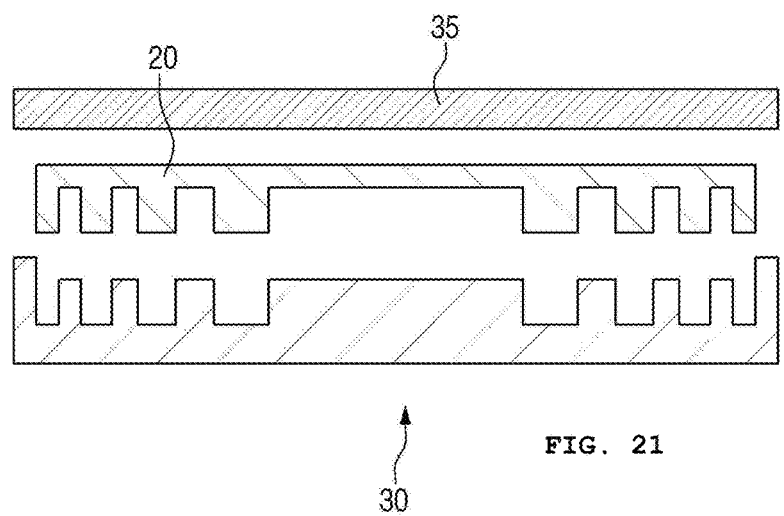
Figure 22:
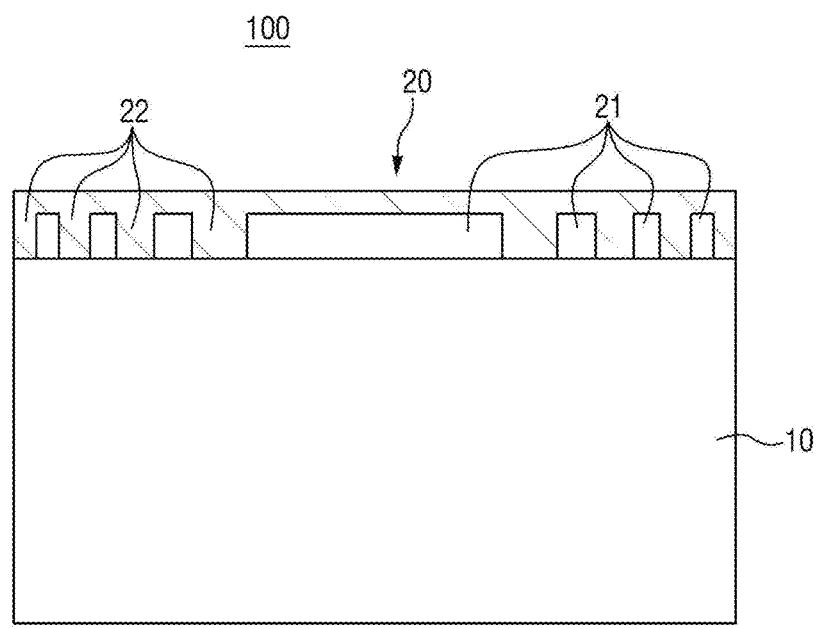

Therefore, the present invention will not be interpreted to be limited to the drawings in which:

FIG. 1 is a cross-sectional view of an ultrasonic transducer to which a spherical acoustic lens of the related art is applied;

FIG. 2 is a plan view of an acoustic lens using a Fresnel zone plate according to an exemplary embodiment of the present disclosure;

FIG. 3 is a cross-sectional view of an acoustic lens using a Fresnel zone plate according to an exemplary embodiment of the present disclosure;

FIG. 4 is a diagram explaining a focusing principle of an acoustic lens using a Fresnel zone plate according to an exemplary embodiment of the present disclosure;

FIG. 5 is a graph of a focal length with respect to the number of concentric regions at every frequency in accordance with an acoustic lens designing method according to an exemplary embodiment of the present disclosure;

FIG. 6 is a graph of a radius of an acoustic lens with respect to the number of concentric regions at every frequency in accordance with an acoustic lens designing method according to an exemplary embodiment of the present disclosure;

FIG. 7 is a flowchart of a designing method of an acoustic lens according to an exemplary embodiment of the present disclosure;

FIG. 8 is a numerical table of radii of concentric regions at every frequency when a focal length is 30 mm according to an acoustic lens designing method of an exemplary embodiment of the present disclosure;

FIGS. 9A-9D are respectively a plan view of an acoustic lens designed to have a radius of 25 mm and 9 concentric circles (FIG. 9A), a cross-section of a Z-axis and an X axis at a focal point (FIG. 9B), and graphs of an intensity of the ultrasonic wave at the Z axis (FIG. 9C) and the X axis (FIG. 9D) when a frequency of an ultrasonic wave which is excited to enter is 1 MHz;

FIGS. 10A-10D are respectively a plan view of an acoustic lens designed to have a radius of 25 mm and 13 concentric circles (FIG. 10A), a cross-section of a Z-axis and an X axis at a focal point (FIG. 10B), and graphs of an intensity of the ultrasonic wave at the Z axis (FIG. 10C) and the X axis (FIG. 10D) when a frequency of an ultrasonic wave which is excited to enter is 1 MHz;

FIGS. 11A-11D are respectively a plan view of an acoustic lens designed to have a radius of 25 mm and 17 concentric circles (FIG. 11A), a cross-section of a Z-axis and an X axis at a focal point (FIG. 11B), and graphs of an intensity of the ultrasonic wave at the Z axis (FIG. 11C) and the X axis (FIG. 11D) when a frequency of an ultrasonic wave which is excited to enter is 1 MHz;

FIGS. 12A-12D are respectively a plan view of an acoustic lens designed to have a radius of 6.25 mm and 7 concentric circles (FIG. 12A), a cross-section of a Z-axis and an X axis at a focal point (FIG. 12B), and graphs of an intensity of the ultrasonic wave at the Z axis (FIG. 12C) and the X axis (FIG. 12D) when a frequency of an ultrasonic wave which is excited to enter is 1 MHz;

FIGS. 13A-13D are respectively a plan view of an acoustic lens designed to have a radius of 25 mm and 9 concentric circles (FIG. 13A), a cross-section of a Z-axis and an X axis at a focal point (FIG. 13B), and graphs of an intensity of the ultrasonic wave at the Z axis (FIG. 13C) and the X axis (FIG. 13D) when a frequency of an ultrasonic wave which is excited to enter is 3 MHz;

FIGS. 14A-14D are respectively a plan view of an acoustic lens designed to have a radius of 25 mm and 13 concentric circles (FIG. 14A), a cross-section of a Z-axis and an X axis at a focal point (FIG. 14B), and graphs of an intensity of the ultrasonic wave at the Z axis (FIG. 14C) and the X axis (FIG. 14D) when a frequency of an ultrasonic wave which is excited to enter is 3 MHz;

FIGS. 15A-15D are respectively a plan view of an acoustic lens designed to have a radius of 25 mm and 17 concentric circles (FIG. 15A), a cross-section of a Z-axis and an X axis at a focal point (FIG. 15B), and graphs of an intensity of the ultrasonic wave at the Z axis (FIG. 15C) and the X axis (FIG. 15D) when a frequency of an ultrasonic wave which is excited to enter is 3 MHz;

FIGS. 16A-16D are respectively a plan view of an acoustic lens designed to have a radius of 6.25 mm and 9 concentric circles (FIG. 16A), a cross-section of a Z-axis and an X axis at a focal point (FIG. 16B), and graphs of an intensity of the ultrasonic wave at the Z axis (FIG. 16C) and the X axis (FIG. 16D) when a frequency of an ultrasonic wave which is excited to enter is 3 MHz;

FIG. 17 is a flowchart of a manufacturing method of an acoustic lens according to an exemplary embodiment of the present disclosure;

FIG. 18 is a cross-sectional view of a mold according to an exemplary embodiment of the present disclosure;

FIG. 19 is a cross-sectional view of a mold which is filled with a transmissive material according to an exemplary embodiment of the present disclosure;

FIG. 20 is a cross-sectional view of a state when a cap is coupled to a mold so that a transmissive material is sealed, according to an exemplary embodiment of the present disclosure;

FIG. 21 is an exploded cross-sectional view of a state when a cap is removed and a manufactured acoustic lens is removed according to an exemplary embodiment of the present disclosure; and FIG. 22 illustrates a cross-sectional view of a focusing transducer in which an acoustic lens manufactured according to an exemplary embodiment of the present disclosure is coupled to an ultrasonic shaker.

DETAILED DESCRIPTION

The above and other objects, features and other advantages of the present disclosure will be more clearly understood from the following detailed description taken in conjunction with the accompanying drawings. As those skilled in the art would realize, the present disclosure is not limited to the described embodiments, but may be embodied in different ways. On the contrary, exemplary embodiments introduced herein are provided to make disclosed contents thorough and complete and sufficiently transfer the essence of the present invention to those skilled in the art.

In this specification, when a component is referred to as being "on" another component, it may be directly on the other component, or an intervening third component may be present. Further, in the drawings, the thicknesses of components are exaggerated for effectively describing the technical contents.

Exemplary embodiments described in this specification may be described with reference to cross-sectional views and/or plan views which are ideal exemplary views of the present disclosure. Further, in the drawings, the thicknesses of film and regions are exaggerated for effectively describing the technical contents. Therefore, a shape of the exemplary view may be modified by a manufacturing technology and/or an allowable error. Accordingly, exemplary embodiments of the present disclosure are not limited to specific illustrated types, but may include modified types which are generated in accordance with the manufacturing process. For example, a region illustrated to have a right angle may be rounded or have a predetermined curvature. Therefore, regions illustrated in the drawings have properties. Shapes of the regions illustrated in the drawings are provided to illustrate a specific shape of a region of an element, but not limit the scope of the present disclosure. Although the terms "first", "second", and the like are used for describing various components, these components are not confined by these terms. These terms are merely used for distinguishing one component from the other components. Exemplary embodiments described herein include complementary embodiments thereof.

The terms used in the present specification are for explaining the embodiments rather than limiting the present invention. Unless particularly stated otherwise in the present specification, a singular form also includes a plural form. The term "comprises" and/or "comprising" used in this specification does not exclude the existence or addition of one or more other components.

When the following specific exemplary embodiments are described, various specific contents are provided for more specific description and understanding of the present disclosure. However, those skilled in the art may understand that the specific exemplary embodiment may be described without using the various specific contents. In some cases, a configuration which is generally known and does not directly relate to the present disclosure will be omitted in order to avoid confusion.

Hereinafter, a configuration and a function of an acoustic lens 20 using a Fresnel zone plate according to an exemplary embodiment of the present disclosure will be described. FIG. 2 is a plan view of an acoustic lens 20 using a Fresnel zone plate according to an exemplary embodiment of the present disclosure. FIG. 3 is a cross-sectional view of an acoustic lens 20 using a Fresnel zone plate according to an exemplary embodiment of the present disclosure. Further, FIG. 4 is a diagram explaining a focusing principle of an acoustic lens 20 using a Fresnel zone plate according to an exemplary embodiment of the present disclosure.

As illustrated in FIGS. 2 and 3, it is understood that an acoustic lens 20 using a Fresnel zone plate according to an exemplary embodiment of the present disclosure has a plurality of concentric regions which is concentrically disposed with respect to a center point.

It is understood that the plurality of concentric regions is formed in a radial direction from a center point such that sound insulation regions 21 which block an entering sound wave and transmission regions 22 which transmit the sound wave are alternately formed. The plurality of sound insulation regions 21 and the plurality of transmission regions 22 having a concentric shape are alternately formed so that the ultrasonic wave which enters through the ultrasonic shaker 10, as illustrated in FIG. 1, is focused near a focal point.

Further, the acoustic lens 20 using the Fresnel zone plate according to an exemplary embodiment of the present disclosure is improved as compared with the spherical acoustic lens of the related art because a thickness is constant and an entering surface and an emitting surface are configured to be planar. Therefore, the size and the weight may be reduced.

Further, as will be described in detail below, radii of the plurality of sound insulation regions 21 and the plurality of transmission regions 22 in the concentric region, where the ultrasonic wave is efficiently focused at a desired focal point, may be calculated based on a set focal length of the acoustic lens 20 and a wavelength in a transmitting medium which is determined from a set frequency of the sound wave.

Further, the transmissive material which configures the transmission region 22 may be glass or rubber. If a material transmits the ultrasonic wave, the material is not specifically limited thereto. Further, a sound insulation material which configures the sound insulation region 21 corresponds to air. The sound insulation material may be configured by an acoustic absorbent having a composite material which induces a scattering process of the sound wave and a matrix material which fills a base of the acoustic absorbent during the scattering process of the sound wave.

Hereinafter, a designing method of an acoustic lens 20 using a Fresnel zone plate according to an exemplary embodiment of the present disclosure will be described. FIG. 5 is a graph of a focal length with respect to the number of concentric regions for every frequency in accordance with an acoustic lens 20 designing method according to an exemplary embodiment of the present disclosure. FIG. 6 is a graph of a radius of the acoustic lens 20 with respect to the number of concentric regions for every frequency in accordance with the acoustic lens 20 designing method according to an exemplary embodiment of the present disclosure. Further, FIG. 7 is a flowchart of a designing method of an acoustic lens according to an exemplary embodiment of the present disclosure.

The designing method of an acoustic lens 20 according to an exemplary embodiment of the present disclosure may design the number of concentric regions which optimally focus the ultrasonic wave near a focal point with a desired focal length at a frequency of an ultrasonic shaker 10 and radii of the plurality of sound insulation regions 21 and the plurality of transmission regions 22.

First, a desired ultrasonic frequency and a desired focal length are determined in step S1. That is, an ultrasonic shaker 10 which excites a desired ultrasonic frequency is selected or the ultrasonic shaker 10 is controlled to excite the desired ultrasonic frequency. When the ultrasonic frequency is determined, an ultrasonic wavelength in a transmission medium is calculated in step S2.

The radii of the plurality of sound insulation regions 21 and the plurality of transmission regions 22 in the concentric region are calculated based on the ultrasonic wavelength and the focal length in step S3. The radii of the plurality of sound insulation regions 21 and the plurality of transmission regions 22 in the concentric region may be calculated by equation (1) given as $$b_m = m\lambda\left(F + \frac{m\lambda}{4}\right),$$

where m is an index of the sequential concentric regions from the center point to the radial direction, $\lambda$ is a wavelength of the sound wave in the transmission medium, and F is a focal length of the acoustic lens 20.

Further, the relationship between the focal length, the radius of the acoustic lens 20, and the wavelength of the sound wave in the transmission medium may be defined by equation (2) given as $$F = \frac{R_a^2}{m\lambda} - \frac{m\lambda}{4},$$

where $R_a$ is a radius of the acoustic lens 20, λ is a wavelength of the sound wave in the transmission medium, and m is the number of concentric regions in the acoustic lens 20.

Further, according to an exemplary embodiment of the present disclosure, a database is provided. Radii of sequential concentric regions at an ultrasonic frequency are calculated for every focal length and are stored as a database. When the focal length and the ultrasonic frequency are determined using the data, radii b1, b2, b3, . . . bm of the concentric regions at every optimal index may be quickly selected.

Further, when the radius of the manufactured acoustic lens 20 is determined within the radius of the ultrasonic shaker 10, the number of concentric regions may be determined. The radius of the acoustic lens 20 is limited within the radius of the ultrasonic shaker 10.

The acoustic lens 20 is manufactured to comply with the number of concentric regions, the radius of the acoustic lens 20, and the radii of the plurality of sound insulation regions 21 and the plurality of transmission regions 22 in the concentric regions.

FIG. 8 illustrates a numerical table of radii of concentric regions at every frequency when a focal length is 30 mm according to an acoustic lens 20 designing method of an exemplary embodiment of the present disclosure. The data which is already calculated is stored in the database and the data is read out to quickly design the radius of each of the concentric region.

That is, as illustrated in FIG. 8, when a desired focal length is 30 mm and a speed in the medium is 1540 m/s, the radius of each of optimal concentric regions when the ultrasonic frequency is 1 MHz to 10 MHz is calculated by Equation 1.

For example, when the focal length is 30 mm and the ultrasonic frequency is 1 MHz, it is understood that a radius b1 of the sound insulation region 21 which is a first concentric region is 6.8 mm, subsequently, a radius b2 of the transmission region 22 is 9.7 mm, and b3=12.0 mm, b4=13.9 mm, . . . b15=28.7 mm.

For example, when a radius of the acoustic lens 20 to be designed is 22 mm, as illustrated in FIG. 8, the number of concentric regions is nine at 1 MHz and a radius of each of nine concentric regions is determined.

Therefore, when the focal length is 30 mm, the ultrasonic frequency is 1 MHz, and the radius of the acoustic lens 20 to be designed is 22 mm, the acoustic lens 20 is manufactured such that the radii of nine concentric regions satisfy the radii determined in the table of FIG. 8.

FIGS. 9A-9D are respectively a plan view of an acoustic lens designed to have a radius of 25 mm and 9 concentric circles (FIG. 9A), a cross-section of a Z-axis and an X axis at a focal point (FIG. 9B), and graphs of an intensity of the ultrasonic wave at the Z axis (FIG. 9C) and the X axis (FIG. 9D) when a frequency of an ultrasonic wave which is excited to enter is 1 MHz.

FIGS. 10A-10D are respectively a plan view of an acoustic lens designed to have a radius of 25 mm and 13 concentric circles (FIG. 10A), a cross-section of a Z-axis and an X axis at a focal point (FIG. 10B), and graphs of an intensity of the ultrasonic wave at the Z axis (FIG. 10C) and the X axis (FIG. 10D) when a frequency of an ultrasonic wave which is excited to enter is 1 MHz.

FIGS. 11A-11D are respectively a plan view of an acoustic lens designed to have a radius of 25 mm and 17 concentric circles (FIG. 11A), a cross-section of a Z-axis and at an X axis at a focal point (FIG. 11B), and graphs of an intensity of the ultrasonic wave at the Z axis (FIG. 11C) and the X axis (FIG. 11D) when a frequency of an ultrasonic wave which is excited to enter is 1 MHz.

FIGS. 12A-12D are respectively a plan view of an acoustic lens designed to have a radius of 6.25 mm and 7 concentric circles (FIG. 12A), a cross-section of a Z-axis and an X axis at a focal point (FIG. 12B), and graphs of an intensity of the ultrasonic wave at the Z axis (FIG. 12C) and the X axis (FIG. 12D) when a frequency of an ultrasonic wave which is excited to enter is 1 MHz.

FIGS. 13A-13D are respectively a plan view of an acoustic lens designed to have a radius of 25 mm and 9 concentric circles (FIG. 13A), a cross-section of a Z-axis and an X axis at a focal point (FIG. 13B), and graphs of an intensity of the ultrasonic wave at the Z axis (FIG. 13C) and the X axis (FIG. 13D) when a frequency of an ultrasonic wave which is excited to enter is 3 MHz.

FIGS. 14A-14D are respectively a plan view of an acoustic lens designed to have a radius of 25 mm and 13 concentric circles (FIG. 14A), a cross-section of a Z-axis and an X axis at a focal point (FIG. 14B), and graphs of an intensity of the ultrasonic wave at the Z axis (FIG. 14C) and the X axis (FIG. 14D) when a frequency of an ultrasonic wave which is excited to enter is 3 MHz.

FIGS. 15A-15D are respectively a plan view of an acoustic lens designed to have a radius of 25 mm and 17 concentric circles (FIG. 15A), a cross-section of a Z-axis and an X axis at a focal point (FIG. 15B), and graphs of an intensity of the ultrasonic wave at the Z axis (FIG. 15C) and the X axis (FIG. 15D) when a frequency of an ultrasonic wave which is excited to enter is 3 MHz.

FIGS. 16A-16D are respectively a plan view of an acoustic lens designed to have a radius of 6.25 mm and 9 concentric circles (FIG. 16A), a cross-section of a Z-axis and an X axis at a focal point (FIG. 16b), and graphs of an intensity of the ultrasonic wave at the Z axis (FIG. 16c) and the X axis (FIG. 16d) when a frequency of an ultrasonic wave which is excited to enter is 3 MHz.

Hereinafter, a manufacturing method of an acoustic lens 20 according to an exemplary embodiment of the present invention will be described in view of FIGS. 17-22. FIG. 17 illustrates a flowchart of a manufacturing method of an acoustic lens 20 according to an exemplary embodiment of the present disclosure.

First, a mold 30 in which a disc shaped protrusion 31 is provided at a center and concentric concave portions 32 and convex portions 33 are alternately and sequentially formed in a radial direction from the protrusion 31 is manufactured in step S10. The radii of the protrusion 31, the concave portions 32, and the convex portions 33 match the sizes designed in accordance with the above-mentioned designing method according to the exemplary embodiment of the present disclosure. FIG. 18 illustrates a cross-sectional view of a mold 30 according to an exemplary embodiment of the present disclosure.

For example, when a desired focal length is 30 mm, a radius of the acoustic lens 20 to be designed is 11.3 mm, and the ultrasonic frequency is 3 MHz, as illustrated in FIG. 8, the mold 30 is manufactured such that an outer radius of the protrusion 31 of the mold 30 is 3.9 mm, an outer radius of a concave portion 32 which is connected to an outer surface of the protrusion 31 is 5.6 mm, a subsequent convex portion 33 is 6.8 mm, a subsequent concave portion is 7.9 mm, a subsequent convex portion 33 is 8.9 mm, a subsequent concave portion 32 is 9.7 mm, a subsequent convex portion 33 is 10.5 mm, and a subsequent concave portion 32 is 11.3 mm. An outermost edge of the mold 30 may be configured by a boundary end 34 which is higher than the convex portion 33.

Next, the mold 30 is filled with a transmissive material 3 which transmits a sound wave in step S20. FIG. 19 illustrates a cross-sectional view of a mold 30 in which the transmissive material 3 is filled according to an exemplary embodiment of the present disclosure. As described above, if the transmissive material 3 transmits the ultrasonic wave, the material is not specifically limited thereto. The material may be rubber or glass.

Next, a cap 35 is coupled to an upper portion of the mold 30 to seal the filled transmissive material 3 in step S30. FIG. 20 illustrates a cross-sectional view of a state when the cap 35 is coupled to the mold 30 so that the transmissive material 3 is sealed, according to an exemplary embodiment of the present disclosure. That is, as illustrated in FIG. 20, the cap 35 is coupled to the boundary end 34 and the transmissive material 3 is filled in a space between the cap 35 and the mold 30 to be sealed.

The transmissive material 3 is cured at a high temperature to be hardened in step S40. Finally, the cap 35 is removed and the cured transmissive material 3 is detached to manufacture the acoustic lens 20. FIG. 21 illustrates an exploded cross-sectional view of a state when the cap 35 is removed and the manufactured acoustic lens 20 is removed according to an exemplary embodiment of the present disclosure.

As illustrated in FIG. 21, the acoustic lens 20 configures a plurality of concentric concave edges. When the acoustic lens 20 is coupled to the ultrasonic shaker 10, the air in the concave edge corresponds to a sound insulation material so that the concave edge becomes the sound insulation region 21 of the acoustic lens 20. FIG. 22 illustrates a cross-sectional view of a focusing transducer 100 in which an acoustic lens 20 manufactured according to an exemplary embodiment of the present disclosure is coupled to the ultrasonic shaker 10.

When the sound insulation region 21 is configured by a material such as an acoustic absorbent rather than air, the sound insulation material which blocks the sound wave and the acoustic absorbent are filled in the concave edge of the detached acoustic lens 20 and hardened. Therefore, the hardened transmissive material 3 configures the transmission regions 22 of the manufactured acoustic lens 20 and the hardened sound insulation material configures the sound insulation regions 21 of the manufactured acoustic lens 20.

Further, a thickness of the manufactured acoustic lens 20 is larger than the ultrasonic wavelength in the sound insulation region 21 and is smaller than the ultrasonic wavelength in the transmission region 22.

In the apparatus and the method thereof described above, the configuration and method of embodiments as described above may not be applied with limitation, but the embodiments may be configured by selectively combining all or a part of each embodiment such that various modifications may be made.

What is claimed is:

1. An acoustic lens using a Fresnel zone plate applied to a focusing ultrasonic transducer, the acoustic lens comprising:
a plurality of concentric regions concentrically disposed with respect to a center point,
wherein in the concentric regions, a sound insulation region which blocks an entering sound wave and a transmission region which transmits the entering sound wave are alternately formed in a radial direction from the center point, and the entering sound wave is focused near a focal point.

2. The acoustic lens according to claim 1, wherein the acoustic lens is configured to be planar such that both surfaces are flat surfaces and a thickness is constant.

3. The acoustic lens according to claim 2, wherein a radius of each of the plurality of sound insulation regions and each of the transmission regions in the concentric regions is calculated based on a set focal length of the acoustic lens and a wavelength in a transmission medium determined from a frequency of a set sound wave.

4. The acoustic lens according to claim 3, wherein radii of the plurality of sound insulation regions and the plurality of transmission regions in the concentric regions are calculated by $$b_m = m\lambda\left(F + \frac{m\lambda}{4}\right),$$

where m is an index of sequential concentric regions from the center point in the radial direction, $\lambda$ is a wavelength of set sound wave in the transmission medium, and F is a focal length of the acoustic lens.

5. The acoustic lens according to claim 4, wherein the focal length of the acoustic lens is defined by $$F = \frac{R_a^2}{m\lambda} - \frac{m\lambda}{4},$$

where $R_a$ is a radius of the acoustic lens, $\lambda$ is a wavelength of the set sound wave in the transmission medium, and m is the number of concentric regions in the acoustic lens.

6. The acoustic lens according to claim 5, wherein the transmissive material which configures the transmission region is at least one of glass and rubber, and the sound insulation material which configures the sound insulation region is air or an acoustic absorbent having a composite material which induces a scattering process of the entering sound wave and a matrix material which fills a base of the acoustic absorbent during the scattering process of the entering sound wave.

7. The acoustic lens according to claim 1, wherein a thickness of the acoustic lens is larger than an ultrasonic wavelength in the sound insulation region, and the thickness of the acoustic lens is smaller than the ultrasonic wavelength in the transmission region.

8. An ultrasonic transducer comprising:
an ultrasonic shaker which excites an ultrasonic wave; and
an acoustic lens using a Fresnel zone plate applied to the ultrasonic shaker, the acoustic lens to receive the ultrasonic wave from the ultrasonic shaker and focus the ultrasonic wave near a focal point, the acoustic lens comprising a plurality of concentric regions concentrically disposed with respect to a center point, wherein in the concentric regions, a sound insulation region which blocks the ultrasonic wave and a transmission region which transmits the ultrasonic wave are alternately formed in a radial direction from the center point.

9. The ultrasonic transducer according to claim 8, wherein the ultrasonic shaker is configured by a piezoelectric element.

10. A method of designing an acoustic lens using Fresnel zone plate, the method comprising:
- determining a desired ultrasonic frequency and a desired focal length;
- calculating an ultrasonic wavelength in a transmitting medium;
- calculating radii of a plurality of sound insulation regions and a plurality of transmission regions in concentric regions, based on the ultrasonic wavelength and the focal length;
- determining a radius of the acoustic lens within a radius of an ultrasonic shaker and a number of the concentric regions; and
- manufacturing the acoustic lens to comply with the number of concentric regions, the radius of the acoustic lens, and the radii of the plurality of sound insulation regions and the plurality of transmission regions in the concentric regions.

11. The method according to claim 10, wherein in the calculating of radii, radii of the plurality of sound insulation regions and the plurality of transmission regions in the concentric regions are calculated by $$b_m = m\lambda\left(F + \frac{m\lambda}{4}\right),$$

where m is an index of the sequential concentric regions from the center point in the radial direction, $\lambda$ is a wavelength of a sound wave in the transmission medium, and F is a focal length of the acoustic lens.

12. The method according to claim 11, wherein in the calculating of radii, radii of sequential concentric regions at an ultrasonic frequency for every focal length are calculated to be stored as a database.

13. A method of manufacturing an acoustic lens using a Fresnel zone plate, the method comprising:
- manufacturing a mold in which a disc shaped protrusion is provided at a center and concentric concave portions and convex portions are alternately and sequentially formed in a radial direction from the disk shaped protrusion;
- filling a transmissive material which transmits a sound wave in the mold;
- sealing the transmissive material as filled in the mold by coupling a cap to an upper portion of the mold;
- hardening the transmissive material; and
- removing the cap and detaching the hardened transmissive material to manufacture the acoustic lens using Fresnel zone plate.

14. The method according to claim 13, wherein an outermost edge of the mold is configured by a boundary edge which is higher than a convex portion, the cap is coupled to the boundary edge and the transmissive material is filled in a space between the cap and the mold.

15. The method according to claim 14, further comprising:
- filling a sound insulation material which blocks the sound wave in a concave edge of the acoustic lens as detached and hardening the sound insulation material,
- wherein the hardened transmissive material configures a transmission region of the acoustic lens and the hardened sound insulation material configures a sound insulation region of the acoustic lens.

16. A method for manufacturing an ultrasonic transducer, the method comprising:
- manufacturing a mold in which a disc shaped protrusion is provided at a center and concentric concave portions and convex portions are alternately and sequentially formed in a radial direction from the disk shaped protrusion;
- filling a transmissive material which transmits a sound wave in the mold;
- sealing the filled transmissive material as filled in the mold by coupling the cap to an upper portion of the mold;
- hardening the transmissive material;
- removing the cap and detaching the hardened transmissive material to manufacture an acoustic lens using a Fresnel zone plate; and
- coupling the acoustic lens using the Fresnel zone plate to an ultrasonic shaker which excites an ultrasonic wave.

\* \* \* \* \*